June 2, 1931.   L. ROUANET   1,807,707

BRAKE OPERATING DEVICE FOR MOTOR VEHICLES

Original Filed March 9, 1925

L. Rouanet
INVENTOR

Patented June 2, 1931

1,807,707

UNITED STATES PATENT OFFICE

LOUIS ROUANET, OF IVRY-PORT, FRANCE, ASSIGNOR TO COMPAGNIE D'APPLICATIONS MECANIQUES, OF IVRY-PORT, SEINE, FRANCE, A FRENCH COMPANY

BRAKE OPERATING DEVICE FOR MOTOR VEHICLES

Original application filed March 9, 1925, Serial No. 14,255, and in France March 21, 1924. Divided and this application filed December 14, 1927. Serial No. 240,017.

The present invention relates to a brake operating device, which is applicable to all known brake systems for steering and driving axles, and which effects automatically an equal distribution of the braking force applied to each of the steering and driving wheels during the running in a straight line of the vehicle, as well as a differential division of this force when the vehicle traverses a curve.

The said device, in which the initial action producing the braking movement acts, under the control of the steering mechanism of the vehicle, on a special arrangement by which it is suitably distributed upon each of the wheels, is characterized in that it comprises in combination: a primary member receiving the brake pull from a pedal, a lever, an auxiliary motor etc.; two secondary members transmitting the brake pull to the wheels or to groups of wheels; and an intermediate member which, under certain conditions, divides the brake pull received from the primary member between the secondary members.

This application is a division of my copending application Serial No. 14,255, filed March 9, 1925, which has become Patent No. 1,750,904, on March 18, 1930.

The invention will be better understood with reference to the accompanying drawings, annexed as examples, and in which.

Figure 1:
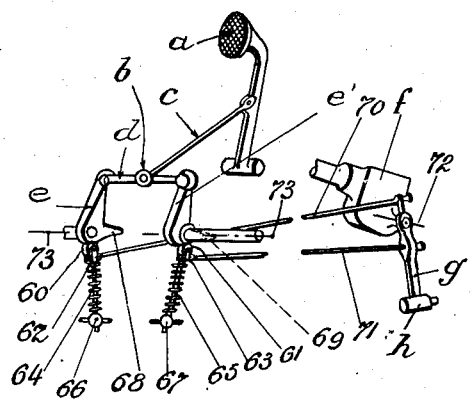
Fig. 1 is a perspective diagrammatic view of an arrangment according to which the conditions of division are modified by means of auxiliary members acting on the secondary members.

In the drawings, $a$ designates the member which is acted upon to operate the brakes. $b$ designates the primary member controlled by the member $a$ through the intermediary of any suitable member $c$. $d$ designates the intermediate distributing member, acting as a beam on the secondary members $e$, $e^1$ through which the braking force is transmitted to the brake shoes actuating devices.

$f$ designates the steering device of the vehicle and $g$ the steering lever which effects simultaneously the steering movements of the wheels through the intermediary of a steering member $h$ and, through the intermediary of rods 70 and 71, a modification of the division of the braking force.

In Fig. 1, the braking force, applied to the pedal $a$, is transmitted, through the brake rod $c$, the primary member $b$ and in turn, by this latter member, to the intermediate member $d$, said braking force being equally divided between the secondary members $e$ and $e^1$ when the vehicle is moving in a straight line or on curves.

To additional or auxiliary members, for example formed by rollers 60 and 61, which are supported in forked members 62 and 63 pressed by springs 64 and 65 and guided by the rods 66 and 67 around which said springs are coiled, bear upon cam shaped members 68 and 69 respectively, formed integral with the secondary members $e$ and $e^1$.

The arrangement and the shape of the cams 68 and 69, relative to the direction of thrust of the rollers 60 and 61, are such that when the said rollers are unconstrained they have a tendency to move towards the axis 73 of the secondary members $e$ and $e^1$. The rods 70 and 71, are connected to the steering lever $g$. According to the example illustrated, they are disposed on each side and at the same distance from the pivoting axis 72 of the steering lever $g$. Said rods 70 and 71 are adapted to move the rollers 60 and 61 away from the pivoting axis 73 of the secondary members $e$ and $e^1$, while bearing on the cams 68 and 69 and pivoting about the points 66 and 67.

The operation is as follows:

When the vehicle is moving in a straight line, the two rollers 60 and 61 bear on the cams 68 and 69, and are spaced at the same distance from the axis 73 of each of the secondary members $e$ and $e^1$, preferably in such a direction that they slightly oppose the braking movement, whereby the automatic return of the brake operating members is insured.

On curves, the steering lever $g$ moves the one or other of the rods 70 and 71, and slides on the other rod, the latter thus remaining in the same position as when the vehicle was moving in a straight line. The actuated rod causes the corresponding roller to move on its cam, the point of contact moving away from the pivoting axis 73 of the corresponding secondary member.

The lever arm of the corresponding spring actuated member is increased, thus acting with an increased force against the braking movement of the considered secondary member. As the forces imparted to each of the secondary members remain always equal, it will be understood that the force involved in braking one of the groups of wheels will be reduced by an amount equal to the force introduced by the spring actuated member.

Figure 2:
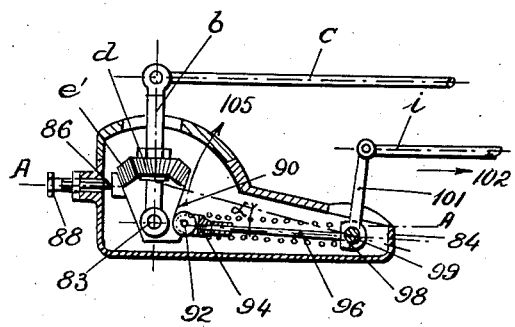
Fig. 2 is a longitudinal section of a mechanical arrangement according to Fig. 1.
Figure 3:
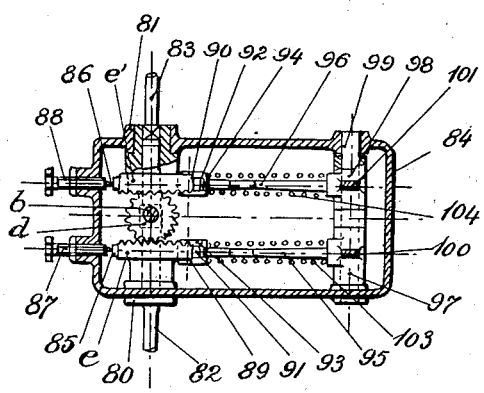
Fig. 3 is a horizontal sectional view on line A—A Fig. 2.

In the Figs. 2 and 3, which show a mechanical arrangement of the device diagrammatically illustrated in Fig. 1, the intermediate member $d$ is formed by a rotatable pinion, freely mounted on the primary member $b$ receiving the brake pull through the member $c$, and divides the pressure equally between two toothed sectors $e$ and $e^1$ forming the secondary members and rotating about the shafts 82 and 83 in extensions 80 and 81 of a casing 84. At one of their ends, the toothed sectors $e$ and $e^1$ bear, as at 85 and 86, against adjustable stops 87 and 88, and their other ends are cam shaped as shown at 89 and 90, to form tracks for the rollers 91 and 92 supported on forked members 93 and 94 adapted to slide on rods 95 and 96, pivotally mounted as at 97 and 98, on a shaft 99 journaled in the casing 84. Levers 100 and 101, each of which is made integral with one of the rods 95 and 96, extend from the casing 84, and are each connected to the steering lever $g$ (not shown) by means of steering rods $i$ so arranged that, for a given direction of steering, one of the rods $i$ is moved in the direction of the arrow 102, whilst, at the same time, the other rod $i$ remains in its position corresponding to the running in a straight line of the vehicle (the operation of the device being of course reversed during a steering movement in the reverse direction). Springs 103 and 104 are provided to press the rollers 91 and 92 on their respective tracks 89 and 90.

When the vehicle is moving in a straight line, the different parts or members are located as indicated in the drawing, that is, the rollers 91 and 92 are springly pressed in the direction of the shafts 82 and 83, or slightly above said shafts, so that the toothed sectors $e$ and $e^1$ are automatically thrust back against the stops 87 and 88.

When the vehicle moves on a curve, one of the levers 100 or 101 is moved in the direction of the arrow 102 by the steering lever (not shown) and the corresponding rod 95 or 96 moves angularly about the axis 99 causing the roller 91 or 92 to roll on its track in the direction of the arrow 105, the angular displacement being dependent on the radius of the curve.

For a given direction of steering the pressure of the spring 104 causes the roller 92 to act on the sector $e^1$ with a certain leverage, the said sector being pressed against its stop with a certain force.

At the same time, none of the parts acting on the sector $e$ has moved out of the working position corresponding to the running in straight line of the vehicle.

If the brakes are applied on the considered curve, the braking force transmitted to the primary member $b$ is equally distributed between each of the members $e$ and $e^1$, one half of this force being integrally transmitted by the sector $e$ to the braking members of the group of wheels controlled by said member, whilst on the contrary, a certain part of the other half of this force is used to overcome the action of the spring 104, on the sector $e^1$, the remainder of this force being used to obtain a reduced braking effect upon the other group of wheels.

In cases where, for a certain steering angle, the half of the braking force transmitted through the pedal, or an equivalent member, is less than the counter action of one of the springs 103 and 104, there is no braking effect on the concerned group of wheels, the brakes being only applied upon one single group of wheels. Such an arrangement is advantageous in certain cases, as it permits, by suitable selection of the groups of wheels, to facilitate the movements on curves by gently applying the brakes, braking of the four wheels being, however, effected when more force is applied to the operating member to overcome the action of the said springs 103 or 104.

Claims:

1. A brake device arrangement comprising means for transmitting braking forces from a main brake operating member to brake shoes operating devices, auxiliary power devices, and means controlled by the steering mechanism to introduce variable actions of the said auxiliary power devices in the transmissions of the said braking forces.

2. A brake device arrangement comprising a mechanism actuated by a main brake operating member and adapted to transmit braking forces to brake shoes actuating devices, and auxiliary power devices controlled by the steering mechanism and adapted to be combined to the braking forces, to modify said braking forces in accordance with the deflection of the front wheels.

3. A brake device arrangement comprising in combination a main brake operating member, a primary member connected therewith and operated thereby, an intermediate member and two secondary brake operating members actuated thereby, brake shoes actuating devices connected to the said secondary brake operating members, and auxiliary power devices the actions of which are controlled by the steering mechanism and adapted to modify the braking forces transmitted to the said brake shoes actuating devices through the said secondary brake operating members when the front wheels are deflected.

4. A brake device arrangement comprising in combination a main brake operating member, a primary member connected therewith and operated thereby, an intermediate member and two secondary brake operating members actuated thereby, brake shoes actuating devices connected to the said secondary brake operating members and means controlled by the steering mechanism and including independent members arranged in movable and yielding contact with each other for varying continuously the braking pulls transmitted to the said brake shoes actuating devices through the said secondary brake operating members when the front wheels are deflected.

5. A brake device arrangement comprising a main brake operating member, a primary member connected therewith and operated thereby, an intermediate member and two secondary members, brake shoes actuating devices connected to the two secondary members and actuated thereby, auxiliary members acting on the secondary brake operating members and spring pressed thereon, and means, controlled by the steering mechanism, to vary the action of the said auxiliary members upon said secondary members, so as to modify the braking forces transmitted to the brake shoes actuating devices in accordance with the deflection of the front wheels.

6. A brake device arrangement comprising a main brake operating member, a primary member connected therewith and operated thereby, an intermediate member and two secondary members, brake shoes actuating devices connected to the two secondary members and actuated thereby, auxiliary members acting on the secondary members and spring pressed thereon, means controlled by the steering mechanism to vary the action of the auxiliary members upon the secondary members, such means including a duplicate system of connections each of which is adapted to act only for one direction of steering, whereby the braking force transmitted through one of the secondary members remains equal while the braking force transmitted through the other secondary member is reduced when the steering wheels are deflected.

7. A brake device arrangement comprising a main brake operating member, a primary member connected therewith and operated thereby, an intermediate member and two secondary members, brake shoes actuating devices connected to each of the two secondary members and actuated thereby, spring actuated auxiliary members acting on cam shaped parts of the secondary members, and means controlled by the steering mechanism to move independently each of the auxiliary members along the said cams for each direction of steering.

8. A brake device arrangement comprising a main brake operating member, a primary member connected therewith and operated thereby, an intermediate member and two secondary members, brake shoes actuating devices connected to the secondary members and actuated thereby, spring actuated auxiliary members acting on cam shaped parts of the secondary members and adapted to reduce individually the braking forces transmitted through said members for each direction of steering, said auxiliary members being adapted to return the secondary members to their initial position.

9. In a brake device arrangement according to claim 5, a casing, a shaft journaled in said casing, the primary member being rotatable on said shaft, a bevel gear freely mounted on said primary member, toothed sectors rotatable on the shaft and meshing with the bevel gear, cam shaped surfaces formed on the side of said toothed sectors and spring pressed members acting on said cam shaped surfaces, means connected to a main brake operating member and adapted to oscillate the primary member about its pivoting shaft, and the means actuated by the steering mechanism being adapted to move the spring pressed members on the cam shaped surfaces.

LOUIS ROUANET.